United States Patent [19]

McDaniel et al.

[11] Patent Number: 4,686,369

[45] Date of Patent: Aug. 11, 1987

[54] ELECTRIC SHIELDING FOR KINESTATIC CHARGE DETECTOR

[75] Inventors: David L. McDaniel, Dousman; Paul R. Granfors, Milwaukee; David M. Hoffman, New Berlin, all of Wis.

[73] Assignee: General Electric Company, Milwaukee, Wis.

[21] Appl. No.: 808,610

[22] Filed: Dec. 13, 1985

[51] Int. Cl.$^4$ .............................................. G01T 1/185

[52] U.S. Cl. ...................................... 250/385; 250/374

[58] Field of Search .................... 250/287, 385 R, 374, 250/382; 378/19, 14 C

[56] References Cited

U.S. PATENT DOCUMENTS

| | | | |
|---|---|---|---|
| 3,626,180 | 12/1971 | Carroll et al. | 250/287 |
| 3,845,301 | 10/1974 | Wernlund et al. | 250/287 |
| 3,936,697 | 2/1976 | Scott | 313/495 |
| 4,236,096 | 11/1980 | Tiemann | 313/495 |
| 4,645,934 | 2/1987 | Allemand et al. | 250/385 |

OTHER PUBLICATIONS

DiBianca et al., "Kinestatic Charge Detection", Med. Phys., 12(3), May/Jun. 1985.

*Primary Examiner*—Carolyn E. Fields

*Attorney, Agent, or Firm*—James H. Beusse; Douglas E. Stoner

[57] ABSTRACT

An apparatus for detecting propogating energy in a defined space includes a medium disposed within the space which interacts with the incident propogating energy to produce secondary energy. An electrostatic field is impressed across the defined space for directing the secondary energy toward a planar detector located at one end of the space. Adjacent the detector is positioned a planar grid for preventing the secondary energy from being detected by the detector prior to passage through the grid. The grid comprises a three layer device having a middle layer formed of an electrically insulative sheet material of a relatively stiff structure. The other two layers comprise conductive layers on opposed surfaces of the first layer which are connected to an electric potential for creating a field across the grid structure and a further field between the grid structure and the detector for accelerating the secondary energy toward the detector in the area of the grid at a space between the grid and detector.

15 Claims, 6 Drawing Figures

ELECTRIC SHIELDING FOR KINESTATIC CHARGE DETECTOR

This invention relates to ionization chamber x-ray detectors and, more specifically, to an improved control grid for use in a ionization chamber which utilizes motion of a detector and associated grid for detecting ionization particles in the chamber.

BACKGROUND OF THE INVENTION

The optimal detection of ionizing radiation in two dimensions is the central problem in computed tomography, digital radiography, nuclear medicine imaging and related disciplines. Many different types of detectors (e.g., non-electronic, analog electronic and digital electronic detectors) have been used with varying degrees of success in these fields. In general, many compromises have been made in the various imaging and non-imaging parameters of detectors in developing opertional systems.

More recently, there has been developed a different type of detector known as the kinestatic charge detector (KCD). In a KCD system, there is provided an x-ray detection volume and a signal collection volume formed in a closed chamber. In the etection volume, there is generally disposed some type of medium which will interact with x-ray radiation to produce secondary energy. The medium is generally enclosed within a defined space and the collection volume is preferably a multi-element detector of secondary energy located at one boundary of the detection volume. An applied electric field across the detection volume imparts a constant drift velocity to secondary energy particles or charges driving the charges of one sign towards the signal collection volume. Charges of the other sign will drift in a direction away from the collection volume and will not contribute to any output signal.

In the operation of the system, an x-ray beam scans a patient and the x-ray radiation passing through the patient is directed into the detection volume. The x-ray radiation collides with particles in the medium of the detection volume creating a secondary energy. The electric field across the detection volume is produced between a first electrode at one side of the detection volume and the plane of the collection volume (collection electrodes) and the direction of the field is substantially perpendicular to the path of the radiation admitted into the detection volume. The electric field causes charge carriers between the first electrode and the collection electrode to drift toward the collection electrode at a substantially constant drift velocity. The chamber itself, including the detection and collection volumes, is mechanically coupled to apparatus which moves the chamber in a direction opposite to the direction of drift of the charges at a constant velocity of a magnitude substantially equal to the magnitude of the drift velocity of the charges. The currents flowing in the plural collection electrodes resulting from charges produced on the collection electrodes by the charge carriers is sensed. The spatial distribution in two dimensions of the radiation admitted into the chamber is determined in response to the amplitude with respect to time of the sensed current flowing in the respective plural collection electrodes.

Since the motion of the chamber is in a direction opposite to the drift of the gas ions created in the medium in the detection volume, the x-ray radiation passing through each small area of the patient in the x-ray beam is integrated over the time that it takes for the ions in the detection volume to drift through the space of the volume. In essence, the motion of the detector combined with the motion of the particles combine to make the x-ray radiation appear to be stationary with respect to the drifting particles. Within the detection volume, a grid is required to separate the space between the first electrode and the collector volume into a drift region and a collection region. The grid shields the collector electrodes from the induced current caused by the charges drifting in the drift region. Since the grid and collector electrodes are at different electrical potentials, the electrodes will be sensitive to microphonic noise caused by relative motion between the grid and the collector electrodes. Such microphonic noise may be caused by motion of the chamber or by other external vibrations induced into the support structure for the chamber. The microphonic noise will result in inaccurate detection of the charged particles and in reproduction of an inaccurate presentation of the actual image of the patient.

The production of microphonic noise by relative motion between a grid and electrodes in an ionization chamber is recognized in U.S. Pat. No. 4,047,040 issued Sept. 6, 1977 and assigned to General Electric Company, although that patent discloses a system in which noise is generated by motion of the anode and cathode electrodes rather than motion of the grid structure. In that patient, an ionzation chamber for a computerized tomography system is illustrated. The microphonic problem is resolved by attaching the grid directly to the anode through an insulating material, the insulating material being deposited on the anode structure. Because the grid need only be maintained at a 30 volt differential with respect to the anode, such a solution is satisfactory. However, as pointed out in that patent, even with an insulative layer of about 0.1 millimeter, the grid structure reduces the quantity of electrons reaching the anode by nearly 50 percent. Such a degree of attenuation is unsatisfactory in a KCD system. Furthermore, in a KCD system, the voltages required are orders of magnitude greater than the CT voltages and would require a substantial increase in the required electrical resistivity of the insulator (typically $10^{14}$ ohms or greater) to reduce electrical leakage from the grid to the collector to a satisfactory level.

It is an object of the present invention to provide an improved grid structure for an ionization chamber.

It is a still further object of the present invention to provide an improved grid structure for use in a KCD system.

SUMMARY OF THE INVENTION

In accordance with the present invention, there is provided an improved grid structure which minimizes the susceptibility of a KCD system to microphonic noise. The grid structure comprises an electrically insulative substrate having first and second surfaces coated with an electrically conductive material. The substrate is preferably formed of a photo etchabel glass material whereby a plurality of uniformly spaced holes may be formed in the substrate and its attached conductive layers. The grid is fixedly mounted in position within an ionization chamber adjacent to but spaced from a collector electrode. Due to the increased thickness and support of the glass substrate the grid structure is relatively insusceptible to vibration and thus minimizes the occurrence of microphonic noise. The conductive layers are each maintained at relatively high electrical potential such that the electrical field in the grid to collector electrode region is more intense that the electric field in other regions of the ionization chamber. The increase in field strength causes the charged particles to accelerte in the collector electrode region so as to prevent collection of charges in the grid structure.

DESCRIPTION OF THE DRAWING

For a better understanding of the present invention, reference may be had to the following detailed description taken in conjunction with the accompanying drawings in which.

DESCRIPTION OF THE PREFERRED EMBODIMENT

Figure 1:
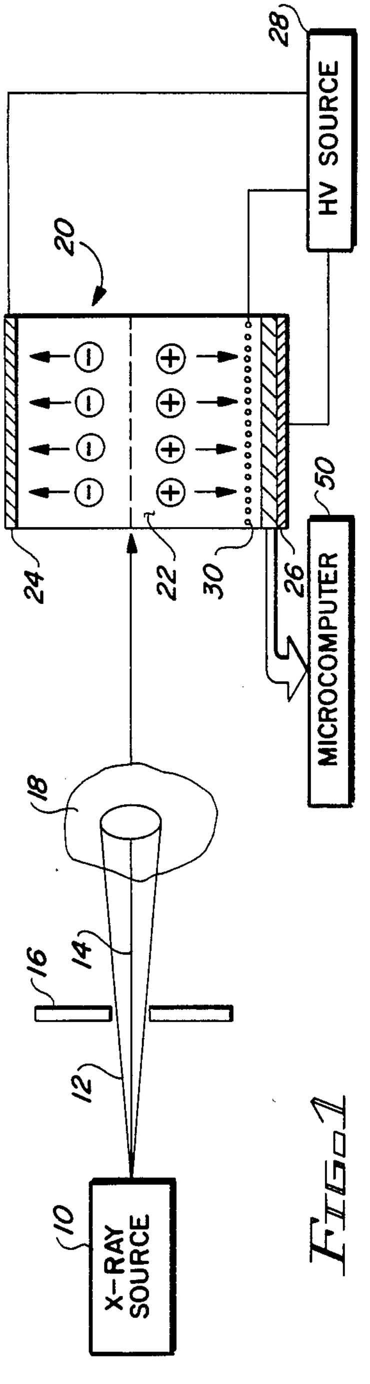
FIG. 1 is a simplified illustration of a kinestatic charge detector system of a type with which the present invention is utilized.

FIG. 1 is a simplified illustration of a kinestatic charge detector (KCD) system of a type with which the present invention is particularly useful. A detailed description of a kinestatic charge detection system can be had by reference to the article entitled "Kinestatic Charge Detection" by Frank A. DiBianca and Marion D. Barker, published in the May/June, 1985 edition of *Medical Physics,* vol. 12, #3, pp. 339–343. In this system, an x-ray source 10 provides a beam of x-ray radiation 12 which is collimated by passage through a slit 14 in as collimater 16. The x-ray radiation passes through a patient 18 and the attenuated radiation then enters into an ionization chamber 20 of the kinestatic charge detection system. The chamber 20 includes an ionization space 22 containing a heavy gas such as xenon in a region between a planar anode 24 and a parallel planar collector electrode 26. A voltage source 28 is connected between the anode 24 and the collector electrode 26 to induce an electric field across the space 22 in the region between the two electrodes. A parallel planar grid 30 is also located in the space 22 adjacent the collector electrode 26. The grid 30 is also provided with an electrical potential from the high voltage source 28.

An x-ray photon which is absorbed in the gas within the space 22 typically produces a photo electron which in turn produces a number of electron/ion pairs in the gas. Electrons drift rapidly to the anode 24 while the ions drift much more slowly to the cathode or collector electrode 26. Because a relatively large voltage is present on the grid, the ions accelerate through the grid and reach the collector electrode 26. The number of ions which reach the collector electrode 26 can be controlled by adjusting the voltage of source 28 so that the electric field between the grid and the collector electrode is sufficient to assure that a continuous field is present to direct the ions toward the collector electrode. As previously stated, mechanical vibrations which may be transmitted to the anode 24, electrode 26 and grid 30 of the ionization chamber 20 may result in variation of the spacing between the grid 30 and the collector electrode 26. Such variations appear as a change in capacitance and thus tend to introduce microphonic error currents into the detector circuits. the electrical noise produced by these microphonic currents may create undesirable artifacts in any image produced from the information derived by collector electrode 26. One solution which has been proposed for this problem is to attach the grid 30 directly to the collector electrodes 26 through an appropriate fixed insulative material. Although such a solution may be practical in ionization chambers in which low grid voltages can be used, such a solution is impractical for the higher voltages necessary in a KCD system.

Before describing the details of the present invention, it should be noted that the grid 30 is a necessary part of the KCD system. In the ionization chamber, as the charges move toward the detector under the influence of the electric field between the anode 24 and the collector electrode 26, the charges tend to induce an equal and opposite charge on the collector electrode 26. Without the grid 30, the detection system would respond to the induced charge, i.e., a generated current, before the charges acutally impinge on the collector electrode 26. With the grid 30 in place close to the detector or collector electrode 26, the electrode 26 is effectively shielded from the effects of the charges until the charges actually reach the grid area. However, the electrode 26 does sense the charges immediately as they pass through the grid rather than when they impact on the electrode. In essence, there is a continuous signal on the collector electrode 26 while the charges are transitioning between the grid structure and the electrode. The time interval for transitioning the charges between the grid and the collector electrode 26 provides the temporal resolution of the system. That is, the shorter the time interval, the better the actual resolution of an image generated by the system. If the grid 30 vibrates, it acts in the same manner as a microphone, i.e., the grid and collector electrode form a capacitor, due to the difference in potential between the grid 30 and collector electrode 26 and the variation in spacing caused by the vibration. The vibration in turn results in a variation in the charge induced on the electrode 26 and creates a detectable current in the electrode. In general, the grid 30 is constructed of a fine wire mesh which is sensitive to any type of mechanical vibration such as a person walking across a floor adjacent the chamber 20.

Figure 2:
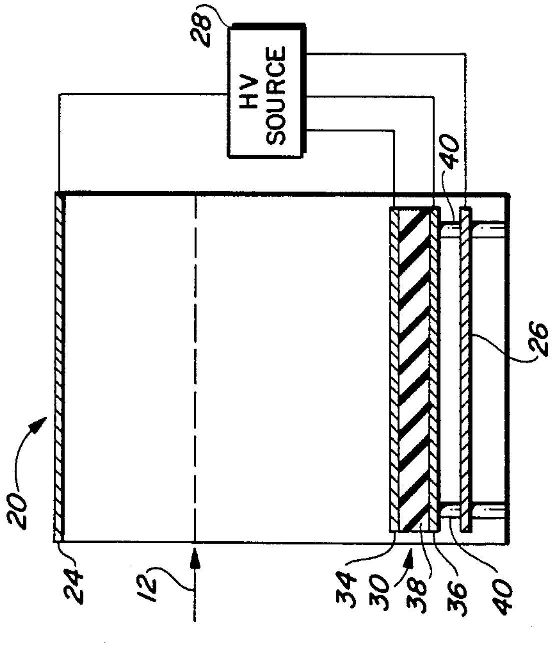
FIG. 2 is a cross-sectional view of an ionization chamber in a KCD device illustrating a grid structure in accordance with the present invention.

The present invention solves the problem of microphonic noise created by grid vibration by constructing a grid in the form of a substrate of glass material having two surfaces which are covered by an electrically conductive material. In essence, the grid structure incorporates two spaced grids supported by a relatively stiff material. Referring now to FIG. 2, there is shown a cross sectional view of a grid structure in accordance with the present invention. As can be seen, the grid structure comprises a first conductive layer 34 and a second conductive layer 36 attached to opposite sides of an insulative substrate 38. The conductive layer 34 is held at a first potential and the conductive layer 36 is maintained at a second electrical potential. The electrical potential on layer 36 is intermediate the potential on layer 34 and the collector electrode 26. Both of the electrodes 34 and 36 are held at electrical potentials which are intermediate that potential between anode 24 and collector electrode 26. The grid structure 30 is supported above the collector electrode 26 by means of insulative standoffs 40. The support includes an electrically grounded guard ring to prevent leakage currents between grid 30 and collector electrodes 26. If no such guard ring is included, the electrical resistance between conductive layer 36 and collector electrode 26 must be greater than $10^{14}$ ohms.

Figure 3:
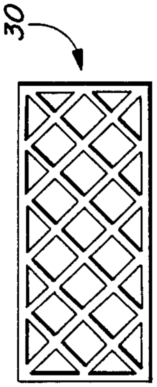
FIG. 3 is a top view of one form of the grid structure of FIG. 2.

In a preferred form, the substrate 38 is formed from a glass material available under the trademark Photoform from Corning Glass Works. This material is a photo etchable glass such that standard integrated circuit techniques may be used to form holes of predetermined dimensions through the glass substrate. Referring to FIG. 3, there is shown a top view of one form of the grid structure 30 in which the holes through the grid structure are formed in the shape of squares or diamonds. In one form these holes will be formed on 20 mil centers (20 milli-inches) with two mil wall thicknesses ("mil" as used herein means 0.001 inch). The dimensions of the holes are therefore 18 mils on a side. Other dimensions for center-to-center spacing may provide better results and it is contemplated that even smaller holes such as, for example, 10 mil diameter holes, may be a preferred size. The holes could be decreased in diameter to about 6 mils which is the desired resolution of a KCD system. In a preferred embodiment, the holes are formed with hexagonal shapes but with essentially the same dimensions. In this arrangement, the glass substrate is approximately 80% hole and only 20% solid materials. However, because of the potential maintained on the layers 34 and 36, ions approaching the grid structure tend to focus toward the holes so that all ions will pass through the grid structure. The thickness of the glass substrate is typically about 15 mils. This thickness provides adequate strength for supporting the grid structure with sufficient thinness to maintain a relatively small space between the two grids 34 and 36. Although the glass material could be formed as a thicker layer, some limitation is inherent because of the aspect ratio, i.e., the wall thickness versus thickness of the substrate is a limiting factor. If the substrate is too thick, any hole through the substrate tends to form a wedge shape rather than straight sidewalls and thus tends to collect ions rather than letting them pass through. The limit on wall thickness versus thickness of the substrate appears to be in the order of about 20 to 1.

It should be noted that for a grid to be constructed having sufficient thickness to provide adequate rigidity and avoid microphonic noise problems, the screen has to be formed of an insulative material. If the grid is constructed of a conductive material, the ions will tend to collect on the conductor unless the voltage of the grid is made very large. At such high voltages, arcing, breakdown and ion multiplication become a problem.

In the arrangement shown in FIG. 2, the voltage at the anode 24 of the ionization chamber 20 is in the range of 5,000 volts. The voltage applied to the first grid layer 34 is typically about 1500 volts while the voltage on the second grid layer 36 is in the range of 700 volts. The collector electrodes 26 are normally at substantially ground potential. Accordingly, there is an electric field distribution starting at the grid layer 34 and ending at the collector electrode 26 which is substantially stronger than the electric field distribution across the chamber 20 form the anode 24 to the collector electrode 26. As the ions created in the ionization chamber move toward the collector electrode 26 and reach the grid 34, this increased electric field will inhibit their collection within the grid structure 30. In order to appreciate the electric field involved in the KCD application, it should be noted that the typical dimensions of the chamber 20 are about 1 centimeter between the anode 24 and collector electrode 26, with a spacing of about 15 mils between the electrode 26 and the grid layer 36. As previously mentioned, the thickness of the insulative layer 38 is also about 15 mils. The conductive layers 34 and 36 are typically only a few hundred angstroms thick and may be vapor deposited or formed using other suitable methods on the glass substrate. It might also be noted that in a typical KCD chamber, the collector electrode is approximately 18 inches wide and from 2 to 3 inches deep from front to back.

Figure 4:
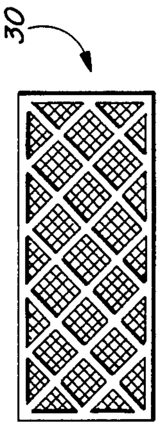
FIG. 4 is a top view of an alternate form of the grid struture of FIG. 2.

Referring now to FIG. 3, there is shown one form of the grid structure 30 in which the hole pattern in the grid structure is formed in the shape of squares or diamonds. In this form, the conductive layers 34 and 36 are concurrent with the underlying glass structure 38. In FIG. 4, there is shown an alternate arrangement in which the substrate layer 38 has the same pattern as that shown in FIG. 3 but the conductive layers 34 and 36 are formed with smaller size openings more typical of a screen grid arrangement. In the arrangement of FIG. 4, the grid layers 34 and 3 would necessarily be formed separately and then attached to the underlying glass layer 38 by use of a suitable adhesive.

Figure 5:
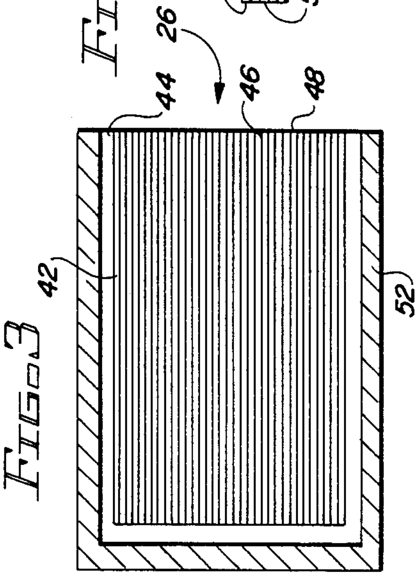
FIG. 5 is a top view of a collector electrode for a KCD apparatus illustrating a structure utilized with the present invention.

Referring now to FIG. 5 there is shown one form of collector electrode 26 in which the ion detector elements are metallic conductors 42 formed on a surface of an insulative circuit board 44 of a type well known in the art. The conductors 42 include fingers 46 terminated at an edge 48 of board 44. The fingers 46 enable electrical connection of the detector elements to appropriate input terminals of microcomputer 50 (shown in FIG. 1). Detailed description of the operation of microcomputer 50 in generting an image from ion detection is discussed in the aforementioned *Medical Physics* article and will be apparent to those familiar with imaging techniques in x-ray technology.

Figure 6:
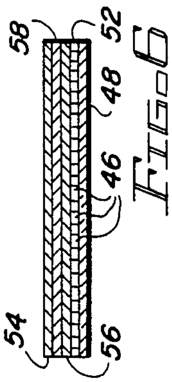
FIG. 6 is an end view of the collector electrode structure of FIG. 5.

FIG. 5 also illustrates the guard ring 52 which comprises a metal conductor strip around three of the outer edges of the upper surface of board 44. The guard ring 52 prevent leakage currents between grid 30 and collector electrode 26. The standoffs 40 shown in FIG. 2 rest on the guard ring 52. In some instances it may be necessary to form standoffs 40 as two strips of insulative material 54 and 56 separated by a conductive strip 58 for supporting grid 30 in the area of the fingers 46 as is shown in the end view of electrode 26 in FIG. 6. The standoff would be formed as a first insulative strip across the fingers 46 followed by a conductive strip over the insulative strip and finally by a second insulative strip to separate the conductive strip from grid 30. The conductive strip is then electrically connected to guard ring 52. The guard ring 52 is electrically connected to system ground.

In addition to the advantages in minimizing microphonic noise, the inventive grid arrangement also significantly improves the system resolution by preventing induced currents, i.e., by providing better shielding of collector electrode 26 from ions in the chamber. While a single grid layer can reduce the induced current to between 4–8 percent of that value which would occur without shielding, applicants' grid arrangement reduces such leakage current to a virtually unmeasurable value, at least less than 0.1 percent.

While the invention has been described in detail in accord with what is considered to be a preferred embodiment, many modifications and changes may be effected by those skilled in the art. For example, the hole structure within the substrate 38 may be in many different patterns such as circular and hexagonal holes. Furthermore, other types of insulative materials may be substituted for the glass substrate. Accordingly, it is intended by the appended claims to cover all such modifications and changes which fall within the true spirit and scope of the invention.

What is claimed is:

1. In an appartus for detecting propagating energy including means defining a space upon which propagating energy is incident, a medium disposed within the space for interacting with the incident energy to produce secondary energy and means for directing the secondary energy toward a planar detector within the space, said directing mens comprising an electric field across the medium generated by a first electric field across the medium generted by a first electric potential at the detector substantially different from a second electric potential at a side of the space opposite the detector, the improvement comprising:

a planar grid positioed adjacent to and spaced from the detector in a plane parallel to a plane of the detector for preventing the secondary energy from being detected by the detector prior to passage through the grid, the grid being formed of three bonded layers comprising a first electrically insulative layer of relatively stiff sheet material electrically separating second and third conductive layers on opposed surfaces of the first layer, said grid including a pluraity of uniformly spaced holes being formed therethrough, each conductive layer being substantially coextensive with the detector; and means for coupling a different voltage to each of said second and third conductive layers for creating a differential electric field through said grid, the voltages applied to each of said conductive layers being intermediate the first and second electric potentials across the medium.

2. The apparatus of claim 1 wherein said material is glass.

3. The apparatus of claim 2 wherein said glass material is photoo-etchable.

4. The apparatus of claim 1 wherein said holes are arranged with center-to-center spacing of between 6 and 20 thousands of an inch.

5. The apparatus of claim 4 wherein the thickness of said material between said holes is approximately 2 thousandths of an inch.

6. The apparatus of claim 1 wherein said first layer is approximately 15 thousandths inch in thickness.

7. The apparatus of claim 1 wherein the conductive layer adjacent the detector is spaced approximately 15 thousandths inch from a surface of the detector.

8. The apparatus of claim 1 wherein the voltage on said third layer is intermediate the voltage on said second layer and the voltage on the detector, said third layer being positioned between the detector and said second layer.

9. In a kinestatic charge detection system wherein a plural element planar detector detects secondary energy generated in a defined space from collision of particles of x-ray radiation beam with a medium located in the space, the secondary energy being directed toward the detector at a controlled velocity by an electric field created across the space, the detector and defined space being moved at the same velocity as the secondary energy in an opposite direction wherein the secondary energy remains stationary with respect to the x-ray radiation, the improvement comprising:

a control grid located within the space adjacent and parallel the detector for minimizing induced charge on the detector from the secondary energy until the secondary energy passes through the grid, said grid comprising an electrically insulative support member formed in a relatively thin sheet and being substantially co-extensive with the detector, a first elecrically conductive plate member attached to a first surface of said support member and a second electrically conductive plate member attached to a second surface of said support member; and means for applying a different electric potential to each of said conductive plate members so as to create an electric field through said grid; and means for supporting said support member in a predetermined spaced relationship with respect to the detector.

10. The system of claim 9 wherein said support member comprises a photoetchabel glass material.

11. The system of claim 10 wherein said support member comprises a glass substrate having electrically conductive material plated on opposed surfaces, said support member and plated surfaces having plural, uniformly spaced holes etched therethrough.

12. The system of claim 11 wherein said glass substrate has a thickness of approximately 15 thousandths of an inch.

13. The system of claim 10 wherein said support member includes a plurality of uniformly dimensioned and spaced holes therethrough, said conductive plate members comprising preformed grid matrices have hole dimensions and spacing different from the holes in said support member, said conductive plate members being adhesively bonded to said support member.

14. The system of claim 9 wherein the detector comprises a plurality of sensing elements on an insulative planar support structure, the elements being positioned on the structure such that a predetermined space exists between the elements and at least three edges of the structure, an electrically grounded conductor being formed along the at least three edges forming a guard ring, said supporting means comprising an insulative strip resting on the guard ring and supporting said support member.

15. The system of claim 14 wherein the detector includes a plurality of fingers extending from the sensing elements to an edge of the structure, said supporting means including a first insulative strip positioned over the fingers, a grounded electrically conductive strip on said first insulative strip, and a second insulative strip n said conductive strip.

* * * * *